United States Patent Office 3,835,003
Patented Sept. 10, 1974

3,835,003
PHOTOPOLYMERIZATION OF OXETANES
Sheldon I. Schlesinger, Hightstown, N.J., assignor to American Can Company, Greenwich, Conn.
No Drawing. Continuation-in-part of application Ser. No. 753,869, Aug. 20, 1968, now Patent No. 3,708,296, dated Jan. 2, 1973. This application Oct. 19, 1972, Ser. No. 298,848
Int. Cl. B01j 1/10; C08g 1/00
U.S. Cl. 204—159.11
14 Claims

ABSTRACT OF THE DISCLOSURE

Polymerization of polymerizable compositions comprising monomers which may be oxetanes or mixtures thereof with monomeric or prepolymeric epoxides is effected by mixing such compositions with radiation-sensitive aromatic diazonium salts which decompose upon application of energy such as electromagnetic radiation to release Lewis Acid to initiate polymerization of said monomers.

CROSS-REFERENCE TO RELATED APPLICATION

This application is a continuation-in-part of application Ser. No. 753,869, filed Aug. 20, 1968, entitled "Photopolymerization of Epoxy Monomers," now U.S. Pat. 3,708,296 issued January 2, 1973.

BACKGROUND OF THE INVENTION

In my co-pending application U.S. Ser. No. 753,869 referred to hereinabove, there are disclosed epoxide-containing materials which are photopolymerizable via use of organic compounds which are radiation-sensitive and release an active catalyst upon exposure to electromagnetic radiation. It has now been discovered that the novel radiation-sensitive catalyst precursors disclosed and claimed therein are effective to initiate photopolymerization of another class of related cyclic monomeric materials, namely oxetanes and mixtures thereof with other materials polymerizable through the action of such catalyst precursors such as epoxides.

The invention more specifically relates to polymerizable compositions comprising a monomeric oxetane and mixtures thereof with monomeric or prepolymeric epoxides and radiation-sensitive aromatic diazonium salts of complex halogenides and process for polymerization of such compositions.

To effect polymerization of the above defined monomers, it is believed to be necessary to open the ring of the monomer through cleavage of the carbon-oxygen bond. A reactive intermediate is formed which can subsequently open up another oxetane ring and this reaction may repeat itself many times in a chain reaction to form a polymer of repeating ether units.

Previously, isolated instances have been reported in the literature wherein oxetanes have been polymerized. However, heretofore polymerization of oxetanes has been carried out by heating the monomer in which a chemical compound was incorporated, until catalysts contained therein were activated, for example, as disclosed in U.S. 2,722,520; Penczek, "Makromolekulare Chemie," Vol. 67, pp. 203–17 (1963); Dreyfuss et al., *Journal of Polymer Science*, Vol. 4, pp. 2179–2200 (1966), etc. In these methods, the activation of the catalyst upon heating initiated polymerization of the various monomers. These methods, though successful, are unsatisfactory in that careful attention must be given to staying within the temperature limitations of the system involved. In order to prevent the harmful effects of heat curing, it is often necessary to extend the curing cycle an unreasonable length of time.

Recently, workers in the art have made many proposals to overcome some of the above deficiencies. For example, U.S. 3,499,759 proposes a system for utilization of oxetanes or other polymerizable materials such as epoxides as components in light-sensitive layers by combining such monomers with certain oxetane polymers specially prepared to contain photoactive groupings such as

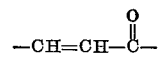

and/or azide groups and effecting polymerization in the presence of suitable catalysts such as boron trifluoride etherate complex. Homopolymers and copolymers thus derived are photo-active and upon exposure to radiation are cured via the groups above mentioned. The disadvantages of a system necessitating pre-synthesis of polymers to contain photoactive groups when compared to a system derived from readily available compounds activated through light initiated decomposition of photosensitive catalysts as in this invention are obvious.

Further, certain aryl diazonium salts have been proposed for use at moderately elevated temperatures to polymerize various cyclic ethers such as trioxane, ethylene oxide, etc., the catalysts therein being activated by light. However, many of the prior art aryl diazonium salts, for example, perchlorates, are explosively hazardous and tend to be chemically unstable. Furthermore, unexpectedly, it has been discovered that the catalyst activity and resulting usefulness of aryldiazonium compounds cannot be determined on a random basis since many aryldiazonium compounds do not possess the requisite properties necessary to catalyze the wide variety of monomeric polymerizable materials of this invention. Accordingly, it is desirable to identify new and improved catalyzing agents useful in the photopolymerization of oxetanes which are not subject to and overcome the deficiencies now existing in the art.

SUMMARY OF THE INVENTION

This invention relates to polymerizable materials comprising a monomeric oxetane or mixtures of said monomer with other materials polymerizable therewith, for example, epoxides, in admixture with a radiation-sensitive catalyst precursor which decomposes upon application of energy to provide a Lewis Acid effective to initiate polymerization of said polymerizable material.

The invention further relates to methods of polymerizing such materials by subjecting the same to the application of energy such as electromagnetic or electron beam irradiation.

DETAILED DESCRIPTION

The monomers defined hereinabove may be any oxetane which is polymerizable to higher molecular weights through the action of a cationic catalyst. In a preferred embodiment, any polymerizable monomer of the class defined or mixture of such monomer with an epoxide material may be utilized.

Oxetanes belong to the class of cyclic ethers and are characterized by a four membered ring structure as illustrated by the formula

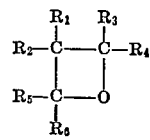

(1)

wherein $R_1$, $R_2$, $R_3$, $R_4$, $R_5$, and $R_6$ may be hydrogen, halogenalkyl, haloalkyl, alkoxy, aryloxy, acetoxy, or aryl wherein halogen substituents are preferably chloro, bromo, fluoro and iodo; the alkyl moities are preferably lower alkyl containing 1 to 6 carbon atoms; the aryl groups are preferably phenyl, and substituted phenyl wherein the substituents thereon are alkyl, halogen, haloalkyl and alkoxy as above defined. Especially preferred are those oxetanes represented by the above formula when $R_1$ and $R_2$ are haloalkyl and $R_3$, $R_4$, $R_5$ and $R_6$ are hydrogen. Such cyclic ethers suitable for use in the present invention include 3,3-bis(chloromethyl oxetane), 3,3-bis(idodomethyl) oxetane, 3,3-bis(methoxymethyl) oxetane, 3,3-bis(phenoxymethyl) oxetane, oxetane, 3-methyl-3-chloromethyl oxetane, 3,3-bis(acetoxymethyl) oxetane, 3,3-bis (fluoromethyl) oxetane, 3,3-bis(bromomethyl) oxetane, 3,3-dimethyl oxetane, etc. 3,3-bis(chloromethyl) oxetane is especially preferred herein.

Many of such oxetane compounds are readily available. Where they are not, they may be readily prepared from pentaerythritol and its derivatives by cyclization of the 1,3-halohydrins by treatment with sodium or potassium hydroxide.

As disclosed hereinabove, compositions of the invention also comprise mixtures of said monomers with other polymerizable materials such as monomeric and prepolymeric epoxides. Any epoxide material or mixture of such epoxide materials, of suitable viscosity alone or when dissolved in a suitable solvent, polymerizable to higher molecular weights may be utilized. Thus monomeric, prepolymeric or resinous epoxides may be employed in the instant compositions. The classic epoxy resin is obtained by the well known reaction of epichlorohydrin and bisphenol A (4,4'-isopropylidene diphenol). The reaction product is believed to have the form of a polyglycidyl ether of bisphenol A, (the glycidyl group being more formally referred to as the 2,3-epoxypropyl group) and thus may be thought of as a polyether derived from the diphenol and glycidol (2,3-epoxy-1-propanol). The structure usually assigned to the resinous product is

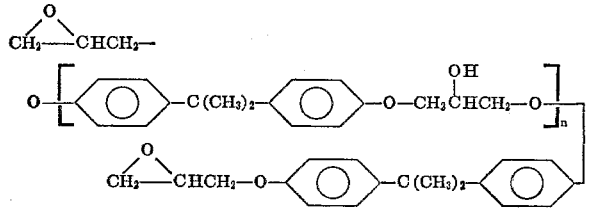

A viscous liquid epoxy resin, average molecular weight about 380, is obtained by reacting the epichlorohydrin in high molecular proportion relative to the bisphenol A, the reaction product containing well over 85 mole percent of the monomeric diglycidyl ether of bisphenol A (n=0), which may be named 2,2-bis[p-2,3-epoxypropoxy)phenyl] propane, and smaller proportions of polymers in which $n$ is an integer equal to 1, 2, 3, etc. This product exemplifies epoxide monomers and prepolymers, having a moderate molecular weight, preferably of the order of 1,000, or less, which may be cross-linked or otherwise polymerized in accordance with the invention, whereby cleavage of the terminal epoxy or oxirane rings is initiated by the action of the Lewis Acids halide released when energy is applied to the latent polymerization catalyst.

Many other epoxide materials are available in polymerizable monomeric or prepolymeric forms. Among these are 1,2-epoxycyclohexane (cyclohexene oxide, also named 7-oxabicyclo[4.1.0]heptane) and vinylcyclohexene dioxide, more specifically named 3-(epoxyethyl)cyclohexane. Etheylene oxide (oxirane,

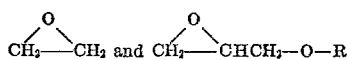

the simplest epoxy ring) and its homologues generally, e.g., propylene oxide (1,2-epoxypropane) and 2,3-epoxybutane, are themselves useful. Other epoxidized cycloalkenes may be used, a readily available polycyclic diepoxide being dicyclopentadiene dioxide, more specifically identified as 3,4-8,9-diepoxytricyclo[5.2.1.0$^{2,6}$] decane.

Glycidyl esters of acrylic acid and of its homologs, methacrylic acid and crotonic acid, are vinyl epoxy monomers are allyl glycidyl ether (1-allyloxy-2,3-epoxypropane) particularly as disclosed and claimed in co-pending U.S. Application, Ser. No. 297,829 filed, Oct. 16, 1972, and glycidyl phenyl ether (1,2-epoxy-3-phenoxypropane). Another readily available product is a mixture of ethers of the structure

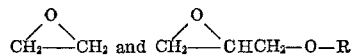

where R is alkyl, that is, glycidyl alkyl ethers. One such mixture contains predominantly glycidyl octyl ether and decyl glycidyl ether; another contains dodecyl glycidyl ether and glycidyl tetradecyl ether. Epoxidized novolac and epoxy cresol novolac propolymers likewise may be used, as well as polyolefin (e.g., polyethylene) epoxides. The latter are exemplified by epoxidized, low molecular weight by-products of the polymerization of ethylene, which may be separated as mixtures high in 1-alkenes in the range from about 10 to 20 carbon atoms, that is from about 1-decene to about 1-eicosene. Epoxidation then provides mixtures of the corresponding 1,2-epoxyalkanes, examples being mixtures high in the 1,2-epoxy derivatives of alkanes having 11 to 14 carbons, or having 15 to 18 carbons.

Esters of epoxidized cyclic alcohols, or of epoxidized cycloalkanecarboxylic acids, or of both, provide useful epoxide or polyepoxide materials. Thus a suitable ester of epoxidized cyclohexanemethanol and epoxidized cyclohexanecarboxylic acid is the diepoxide (3,4-epoxycyclohexyl)methyl 3,4- epoxycyclohexanecarboxylate; this same ester may be indexed under the name 7-oxabicyclo[4.1.0] hept-3-ylmethyl 7-oxabicyclo[4.1.0]heptane-3-carboxylate. Another suitable diepoxide may be obtained as an ester of a substituted (epoxycycloalkyl)methanol and a dibasic acid, for example, bis[3,4-epoxy-6-methylcyclohexyl)methyl] adipate, which may be named alternatively bis[4-methyl-7-oxabicyclo-[4.1.0]hept-3-yl)methyl] adipate Diepoxide monomeric materials may be obtained conveniently as bis(epoxyalkyl) ethers of glycols, an example being the digylcidyl ether of 1,4-butanediol, that is, 1,4-bis(2,3-epoxypropoxy)butane. This diepoxide is related to the diglycidyl ether of bisphenol A, shown above as 2,2-bis[p-(2,3-epoxypropoxy)phenyl]propane.

Other examples of suitable epoxide materials are epoxy alkyl ethers of alkyl silanes such as glycidoxypropyl trimethoxysilane.

The materials utilized as latent polymerization initiators in the process and compositions of the present invention are radiation-sensitive catalyst precursors which decompose to provide a Lewis acid upon application of energy. The energy required for effective decomposition may be energy applied by bombardment with charged particles, notably by high-energy electron beam irradiation. Preferably, however, the catalyst precursors are photosensitive, and the required energy is imparted by actinic irradiation, which is most effective at those regions of the electromagnetic spectrum at which there is high absorption of electromagnetic energy by the particular catalyst precursor used. More than one of these types of energy may be applied to the same system; e.g., ultraviolet light irradiation followed by electron beam irradiation, may be employed, although ultraviolet irradiation ordinarily can effect a suitable cure.

The preferred photosensitive Lewis acid catalyst precursors are aromatic diazonium salts of complex halogenides, which decompose upon application of energy to release a halide Lewis acid. The aromatic diazonium cation may be represented generally as $[Ar-N \equiv N]^+$, where the aryl group Ar, which may be an alkaryl hydrocarbon group, is bonded to the diazonium group by replacing one of the hydrogen atoms on a carbon atom of the aromatic nucleus, and where the aryl group ordinarily carries at least one pendant substituent for greater stability of the cation. Thus the pendant substituent may be alkyl, or another substituent, or both. The complex halogenide anion may be represented by $$[MX_{n+m}]^{-m}.$$

Thus, the photosensitive salt and its decomposition upon actinic irradiation may be depicted as follows:

$$[Ar-N\equiv N]_m[MX_{n+m}]^{-m} \xrightarrow{h\nu} mAr-X + mN_2 + MX_n, \quad (1)$$

where X is the halogen ligand of the complex halogenide, M is the metallic or metalloid centrol atom thereof, $m$ is the net charge on the complex halogenide ion, and $n$ is the number of halogen atoms in the halide Lewis acid compound released. The Lewis acid halide $MX_n$ is an electron pair acceptor, such as $FeCl_3$, $SnCl_4$, $PF_5$, $AsF_5$, $SbF_5$, and $BiCl_3$, which upon suitable irradiation of the diazonium complex salt is released in substantial quantities and initiates or catalyzes the polymerization process, wherein the monomeric or prepolymeric material is polymerized or cured as the result of the actinic irradiation.

The diazonium compounds of the present invention may be prepared using procedures known in the art, and such preparation forms no part of the present invention. Thus, for example, chlorometallic halogenide complexes may be prepared in accordance with the method set forth by Lee et al. in Journal of the American Chemical Society, 83, 1928 (1961). Exemplifying a procedure of general utility, aryldiazonium hexafluorophosphates can be prepared by diazotizing the corresponding aniline with $NOPF_6$, made by combining HCl and $NaNO_2$ with subsequent addition of hydrogen hexafluorophosphate ($HPF_6$) or of a hexafluorophosphate salt, or they can be prepared by addition of a hexafluorophosphate salt to another diazonium salt to effect precipitation. As a further example, various morpholinoaryl complexes, containing the group

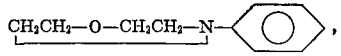

can be prepared either from the aniline derivative or by adding an aqueous solution of a metal salt of the desired complex halogenide to a solution of morpholinobenzenediazonium tetrafluoroborate.

Illustrative of the aromatic diazonium cations comprised in the photosensitive catalyst salts utilized in accordance with the present invention are the following:

p-chlorobenzenediazonium
2,4-dichlorobenzenediazonium
2,5-dichlorobenzenediazonium
2,4,6-trichlorobenzenediazonium
2,4,6-tribromobenzenediazonium
o-nitrobenzenediazonium
p-nitrobenzenediazonium
4-nitro-o-toluenediazonium
(2-methyl-4-nitrobenzenediazonium)
2-nitro-p-toluenediazonium
(4-methyl-2-nitrobenzenediazonium)
6-nitro-2,4-xylenediazonium
(2,4-dimethyl-6-nitrobenzenediazonium)
2-chloro-4-(dimethylamino)-5-methoxybenzenediazonium
4-chloro-2,5-dimethoxybenzenediazonium
2,4′,5-triethoxy-4-biphenyldiazonium
(2,5-diethoxy-4-(p-ethoxyphenyl)benzenediazonium)
2,5-dimethoxy-4′-methyl-4-biphenyldiazonium
(2,5-dimethoxy-4-(p-tolyl)benzene-diazonium)
2,5-diethoxy-4-(phenylthio)benzenediazonium
2,5-diethoxy-4-(p-tolylthio)benzenediazonium
p-morpholinobenzenediazonium
2,5-dichloro-4-morpholinobenzenediazonium
2,5-dimethoxy-4-morpholinobenzenediazonium
4-(dimethylamino)-naphthalenediazonium Illustrative of the complex halogenide anions comprised in the photosensitive catalyst salts utilized in accordance with the present invention are the following:

tetrachloroferrate(III), $FeCl_4^-$
hexachlorostannate(IV), $SnCl_6^{2-}$
tetrafluoroborate, $BF_4^-$
hexafluorophosphate, $PF_6^-$
hexafluoroarsenate(V), $AsF_6^-$
hexafluoroantimonate(V), $SbF_6^-$
pentachlorobismuthate(III), $BiCl_5^{2-}$ A selection of aromatic diazonium salts of complex halogenides as listed in Table I. Many of the salts listed have been found to be well adapted or superior for use as latent photosensitive polymerization initiators in the process and compositions of the present invention, based on thermal stability, on solubility and stability in the monomer formulations and solvents (if any) used, on photosensitivity, and on ability to effect polymerization with the desired degree of curing after adequate actinic irradiation. Following the name of each aromatic diazonium halogenide is its melting point or decomposition temperature in degrees centigrade, and wavelengths of electromagnetic radiation, in nanometers, at which its exhibits absorption maxima.

TABLE I

| | M.P.,[1] °C. | Absorption maximum nm. |
|---|---|---|
| 2,4-dichlorobenzenediazonium tetrachloroferrate(III) | 62–64 | 259, 285, 360 |
| p-Nitrobenzenediazonium tetrachloroferrate(III) | 93–95 | 243, 257, 310, 360 |
| p-Morpholinobenzenediazonium tetrachloroferrate(III) | 121.5 | 240, 267, 313, 364 |
| 2,4-dichlorobenzenediazonium hexachlorostannate(IV) | 190 | 285 |
| p-Nitrobenzenediazonium hexachlorostannate(IV) | 126 | 258, 310 |
| 2,4-dichlorobenzenediazonium tetrafluoroborate | 152 | [2] 285, 325–340 |
| p-Chlorobenzenediazonium hexafluorophosphate | 162–164 | 273 |
| 2,5-dichlorobenzenediazonium hexafluorophoshpate | [3] 140 | 264, 318 |
| 2,4,6-trichlorobenzenediazonium hexafluorophosphate | 240–250 | 294, 337 |
| 2,4,6-tribromobenzenediazonium hexafluorophosphate | 245–260 | 306 |
| p-Nitrobenzenediazonium hexafluorophosphate | [1] 156(178) | 258, 310 |
| o-Nitrobenzenediazonium hexafluorophosphate | 161.5 | |
| 4-nitro-o-toluenediazonium hexafluorophosphate | 123(138) | 262, 319 |
| 2-nitro-p-toluenediazonium hexafluorophosphate | 164–165 | 286 |
| 6-nitro-2,4-xylenediazonium hexafluorophosphate | 150 | 237, 290 |
| p-Morpholinobenzenediazonium hexafluorophosphate | 162(181) | 377 |
| 4-chloro-2,5-dimethoxybenzenediazonium hexafluorophosphate | 168–169 (198–208) | [2] 243, 287, 392 |
| 2,5-dimethoxy-4-morpholinobenzenediazonium hexafluorophosphate | >135 | 266, 396 |
| 2-chloro-4-(dimethylamino)-5-methoxybenzenediazonium hexafluorophate | 111 | 273, 405 |
| 2,5-dimethoxy-4-(p-tolylthio)benzenediazonium hexafluorophosphate | 146(155) | 358, 400 |
| 2,5-diethoxy-4-(p-tolylthio)benzenediazonium hexafluorophosphate | 147(150) | [2] 223, 247, 357, 397 |
| 2,5-dimethoxy-4′-methyl-4-biphenyldiazonium hexafluorophosphate | 167 | 405 |
| 2,4′,5-triethoxy-4-biphenyldiazonium hexafluorophosphate | 136 | 265, 415 |
| 4-(dimethylamino)-1-naphthalenediazonium hexafluorophosphate | 148 | 280, 310, 410 |
| p-Nitrobenzendiazonium hexafluoroarsenate(V) | 141–144(161) | 257, 310 |
| p-Morphollnobenzenediazonium hexafluoroarsenate(V) | 162(176–177) | 257, 378 |
| 2,5-dichlorobenzenediazonium hexafluoroantimonate(V) | 161–162.5 | 238, 358 |
| p-Nitrobenzenediazonium only hexafluoroantimonate(V) | 140–141 | 257, 308 |

See footnotes at end of table.

TABLE I—Continued

| | M.P.,[1] ° C. | Absorption maximum nm. |
|---|---|---|
| p-Morpholinobenzenediazonium hexafluoroantimonate(V) | 153(177.5–180.5) | 254, 374 |
| 2,4-dichlorobenzenediazonium hexachloroantimonate(V) | 178–180 | 279,[2] 322 |
| p-Nitrobenzenediazonium fluoroborate | 140(148–50) | 258, 311 |
| 2,5-diethoxy-4-(p-tolylthio) benzenediazonium fluoroborate | 150(157) | 354, 403 |
| p-N-morpholino benzenediazonium fluoroborate | 155(163) | 257, 373 |
| 2,4-dichlorobenzenediazonium pentachlorobismuthate(III) | 193.5–195 | 285, 313 |
| o-Nitrobenzenediazonium pentachlorobismuthate(III) | 166.5–168 | 285, 313 |

[1] The melting points given in Table I were determined generally by the usual visual capillary tube method; in most cases discoloration began below the observed melting point temperature with frothing decomposition at that temperature. In some cases melting points or exotherms were determined also by differential thermal analysis under nitrogen gas, and the temperatures so determined are given in parentheses. The wavelengths of absorption maxima in the ultraviolet-to-visible range were determined with the diazonium complex salt dissolved in acetonitrile.
[2] Shoulder.
[3] Decomposition.

In accordance with the present invention, the procedures for admixing the radiation-sensitive compounds with the polymerizable materials are relatively simple and can be carried out in the following manner:

Oxetane monomer of mixtures containing such monomers as heretofore defined are combined with a radiation-sensitive aryldiazonium compound of the invention. Suitable inert solvents may be employed if desired in effecting this mixture. By a suitable inert solvent is meant one that does not react appreciably with the polymerizable material or the aryl-diazonium compound before exposure to actinic radiation. Examples of such solvents include dimethyl ether of diethylene glycol, anisole, acetonitrile, butyronitrile, toluene, acetone, xylene, methyl ethyl ketone, ethyl ether, cellosolve ether, 1,1,2,2-tetrachloroethane, monochlorobenzene, tetrachloroethane, O-chlorotoluene, O-dichlorobenzene, trichloroethylene, propylene carbonate, etc. Mixtures of these solvents may be employed particularly if mixtures of epoxides are employed. It is to be understood, however, that the use of solvents is not mandatory in carrying out the present invention. The exact amount of solvent necessary will depend upon the particular polymerizable material and diazonium compound employed, most of which are soluble in any event in the oxetane monomers of the invention. Where they are not, the solvent is used in sufficient quantity to dissolve both the aryldiazonium compound and any insoluble polymerizable component.

The amount of photosensitive compound employed in the admixture need not be specifically ascertained but is related to the amount of monomer being polymerized. It has been found that quite satisfactory results are obtained by providing a diazonium complex salt in amount by weight of from about 0.5% to about 5% of the catalyst precursor relative to the weight of the polymerizable material provided, about 1% or less being amply effective with some of the monomer-catalyst precursor systems.

Referring to equation 1 hereinabove showing the photolytic decomposition of the catalyst percursor, the halide Lewis acid $MX_n$ released reacts with the monomers of the invention with a result exemplified by the following:

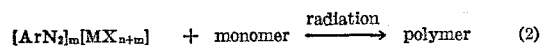

$$[ArN_2]_m[MX_{n+m}] + \text{monomer} \xrightarrow{\text{radiation}} \text{polymer} \quad (2)$$

The cationic catalyst is believed to act by causing cleavage of a carbon-oxygen bond in the monomer initiating growth of a polymeric chain or permitting formation of a cross-linkage. A general application of the process embodied by equations 1 or 2 can be as follows: a diazonium complex salt, for example, as identified hereinabove, is admixed with or without the use of a suitable solvent, with a monomer. The mixture is thereafter coated on a suitable substrate such as a metal plate, plastic, or paper, and the substrate is exposed to ultraviolet or electron beam radiation. On exposure the diazonium compound decomposes to yield the Lewis acid catalyst, which initiates the polymerization of the monomer.

The source of radiation for carrying out the method of the present invention can be any suitable source, such as the ultraviolet actinic radiation produced from a mercury, xenon, or carbon arc, or the electron beam produced by a cathode ray gun. The only limitation placed on the radiation source used is that it must have an energy level at the irradiated film sufficient to impart to the polymerizable system energy at an intensity high enough to reach the decomposition level of the photosensitive compounds. As previously noted, the wavelength (frequency) range of actinic radiation is chosen to obtain sufficient absorption of energy to excite the desired decomposition.

For an imaging system, a mixture of the monomers with epoxides, which may contain a suitable solvent in substantial proportions, is coated on a metal plate, dried if necessary to remove solvent present, and the plate is exposed to ultraviolet light through a mask or negative. The light initiates polymerization which propagates rapidly in the exposed image areas. The resulting polymer in the exposed areas is resistant to many or most solvents and chemicals, while the unexposed areas can be washed with suitable solvents to leave a reversal image of a polymer in this embodiment.

The polymers produced by the polymerization process of the present invention when monomer and epoxides are employed are useful in a wide variety of applications in the field of graphic arts, due to their superior adhesion to metal surfaces, excellent resistance to most solvents and chemicals, and capability of forming high resolution images. Among such uses are photoresists for chemical milling, gravure images, offset plates, stencil-making, micro-images for printed circuitry, thermoset vesicular images, micro-images for information storage, decoration of paper, glass, and packages, encapsulation of printed circuits, and light-cured coatings. The polymers produced by photopolymerization of the oxetane monomers alone are useful in many applications, where ultra-violet light cured coatings are employed particularly as protective and decorative coatings or as viscosity regulators for epoxy resins. 3,3-bis(chloromethyl) oxetane is the monomer precursor for the polymer known as Penton. It is a chlorinated polyether characterized by high resistance to chemicals and to thermal degradation at molding and extrusion temperatures. Such polymers are used as insulating coatings because of high electrical resistance. See, for example, U.S. Pat. 2,722,492. The present process provides a method for the direct photocuring of such coatings as well as a method for the bulk polymerization of monomers leading to such polymers suitable for use as highly valuable coatings.

It may be desirable to include in the composition an inert pigment or filler, which may be present in even a major proportion by weight, or small amounts of inert nonvolatile liquids such as mineral oil. Inclusion of such inert ingredients usually makes advisable a proportionate increase in the optium amount of catalyst precursor used. Nevertheless, the precursors needed rarely exceeds 5% of the entire weight of the compositions.

It may further be desirable to include stabilizers or gelation inhibitors for said mixtures of monomers and catalyst particularly when such admixture includes epoxides. Suitable compounds for such purpose may be sulfoxides such as methyl sulfoxide, propyl sulfoxide, the 1-oxide of tetrahydrothiophene, etc. as disclosed in U.S. application Ser. No. 144,665 filed May 18, 1971 now U.S. Pat. 3,711,-391 issued Jan. 16, 1973; organic amides and ureas such as N,N-dimehylacetamide and 1,1,3,3-tetramethylurea as disclosed in U.S. application Ser. No. 144,666 filed May 18, 1971 now U.S. Pat. 3,711,390 issued Jan. 16, 1973; cyclic amides such as 1-methyl-2-pyrrolidinone, poly(1-vinyl-2-pyrrolidinone), etc. as disclosed in U.S. application Ser. No. 144,642 and organic nitriles such as acetonitrile as disclosed in U.S. application Ser. No. 144,667 filed May 18, 1971 now U.S. Pat. Nos. 3,721,617 and 3,721,-616 respectively, both issued Mar. 20, 1973. When employed, as disclosed in said co-pending applications the inhibitors are utilized in amounts which may vary from about 0.005 to 1% of the weight of the polymerizable material present in the composition, an amount of inhibitor less than about 1% by weight of the polymerizable material being nearly always sufficient.

The following examples will serve to further illustrate the present invention.

Example 1

(a) 5 grams of 3,3-bis(chloromethyl) oxetane and 0.250 g. of 2,5-diethoxy-4-(p-tolylthio)benzene diazonium hexafluorophosphate were combined. The mixture was divided into two parts and placed in two aluminum dishes. While cooling the bottom of each dish in an ice bath, the two dishes were exposed to a 360 watt mercury ultraviolet lamp for 3 and 6 minutes respectively. Following removal of the dishes from the ice bath, some signs of coagulation were noted. After standing at room temperature overnight, a solid material, insoluble in methanol having a powdery, amorphous consistency was left in each dish.

(b) When the procedure above is repeated employing 2,5-dichlorobenzene diazonium hexafluorophosphate as catalyst, similar results are obtained.

Example 2

Two aluminum plates were coated respectively with samples of the formulations (a) and (b) of example 1. The coated plates were exposed to a 360 watt mercury arc for 30 seconds and stored at 0° C. After 2 hours in the cold, they were left at room temperature for another four hours. During this time, both coatings became hard waxes insoluble in acetone and methanol.

Example 3

Ten g. of freshly distilled 3,3-bis(chloromethyl) oxetane was combined with 0.100 g. of 2,5-diethoxy-4-(p-tolylthio) benzene diazonium hexafluorophosphate to form an incomplete solution. The mixture in a Pyrex test tube was exposed for 10 minutes at 43 centimeters distance from a 200 watt mercury arc. During this time an exothermic reaction took place and a white solid formed around the inside of the test tube. After removal from the light for examination for 20 minutes, the sample was re-exposed for another 10 minutes. There was still mostly liquid in the tube with the inside of the tube having a thick coating of polymeric material. After one day, methanol was mixed with the contents of the test tube and the loose solid that settled out was collected on a suction funnel. The remainder of the solid polymer, formed in a thick coating around the inside wall of the test tube, could not be removed by the methanol, but was taken up in 50 ml. boiling cyclohexanone. After cooling to room temperature, the resulting suspension was poured into 100 ml. of methanol and filtered on a suction funnel. The white solid that was collected was washed several times with methanol and air dried. 5.8 g. of white polymer was thus obtained. Differential thermal analysis of the polymer showed endotherms at 180° and 187° C. The intrinsic viscosity in cyclohexanone at 80° was 0.29.

Another reaction mixture prepared as above, but with 1.8 microliters of water added to the original formulation, yielded 4.6 g. of a white powder. This product had an endotherm at 190° C. Its intrinsic viscosity was 0.27.

Example 4

5 g. of a 6:1 glycidyl methacrylate-allylglycidyl ether copolymer described in co-pending application Serial No. 753,869 was dissolved in 25 g. of 3,3-bis-(chloromethyl) oxetane, together with 1.52 g. of 2,5-diethoxy-4-(p-tolylthio)benzene diazonium hexafluorophosphate. A clear viscous yellow solution resulted. A portion of this solution was utilized to prepare a draw down coating on a sheet of grained aluminum employing a No. 6 wire-wound rod. The coating was exposed to a 360 w. mercury arc (Uviarc) lamp for 5 seconds at a distance of 22 cm. Curing began immediately after exposure resulting in a hard, glossy coating which was not marred by the touch after two hours. The coating was insoluble in methyl ethyl ketone and resisted abrasion as results from hand rubbing even when immersed in methyl ethyl ketone after the 2 hour post-exposure curing period.

It is thought that the invention and many of its attendant advantages will be understood from the foregoing description and it will be apparent that various changes may be made in the matter of the ingredients, their identity. and their proportions and in the steps of the process and their order of accomplishment without departing from the spirit and scope of the invention or sacrificing all of its material advantages, the form hereinabove described being merely a preferred embodiment thereof.

I claim:

1. A polymerizable composition comprising:
an oxetane monomer polymerizable to higher molecular weights through the action of a cationic catalyst, or mixtures thereof with a monomeric or prepolymeric 1,2-epoxide material and a radiation-sensitive aromatic diazonium salt of a complex halogenide which decomposes upon irradiation to provide a Lewis acid effective to initiate polymerization of said polymerizable monomer, said radiation-sensitive salt having had substantially no exposure to a radiation source.

2. The composition of claim 1 wherein said monomer is an oxetane of the general formula:

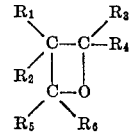

wherein $R_1$, $R_2$, $R_3$, $R_3$, $R_5$ and $R_6$ are hydrogen, halogen, haloalkyl, aryl, alkyl, alkoxy, aryloxy and acetoxy radicals.

3. The composition of claim 2 wherein $R_1$ and $R_2$ are haloalkyl.

4. The composition of claim 2 wherein $R_1$ and $R_2$ are chloromethyl radicals and $R_3$, $R_4$, $R_5$, and $R_6$ are hydrogen.

5. The composition of claim 2 wherein said complex halogenide is hexafluorophosphate.

6. The composition of claim 4 wherein said complex halogenide is 2,5-diethoxy-4-(p-tolylthio) benzene diazonium hexafluorophosphate.

7. The composition of claim 2 wherein said monomer is in admixture with a monomeric or prepolymeric epoxide.

8. The process of polymerizing an oxethane monomer polymerizable to higher molecular weights through the action of a cationic catalyst or mixtures thereof with a monomeric or prepolymeric 1,2-epoxide material which comprises:
forming a mixture of said monomer and a radiation-sensitive aromatic diazonium salt of a complex halogenide which decomposes upon irradiation to provide a Lewis Acid effective to initiate polymerization of said monomer
and subsequently exposing the resulting mixture to irradiation to release said Lewis Acid in sufficient amounts to effect polymerization of said monomer.

9. The process of claim 8 wherein said monomer is an oxetane of the general formula:

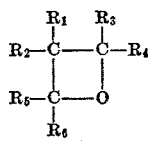

wherein $R_1$, $R_2$, $R_3$, $R_4$, $R_5$ and $R_6$ are hydrogen, halogen, haloalkyl, aryl, alkyl, alkoxy, aryloxy and acetoxy radicals.

10. The process of claim 9 wherein said irradiation is electromagnetic radiation.
11. The process of claim 9 wherein said oxetane is 3,3-bis(chloromethyl) oxetane.
12. The process of claim 11 wherein said complex halogenide is hexafluorophosphate.
13. The process of claim 12 wherein said complex halogenide is 2,5-diethoxy-4-(p-tolylthio) benzene diazonium hexafluorophosphate.
14. The process of claim 8 wherein said monomer is in admixture with a monomeric or prepolymeric epoxide.

References Cited

UNITED STATES PATENTS

| | | | |
|---|---|---|---|
| 3,711,390 | 1/1973 | Feinberg | 204—159.11 |
| 3,711,391 | 1/1973 | Feinberg | 204—159.11 |
| 3,721,617 | 3/1973 | Watt | 204—159.11 |
| 3,721,616 | 3/1973 | Watt | 204—159.11 |
| 3,708,296 | 1/1973 | Schlesinger | 96—33 |
| 3,236,784 | 2/1966 | Fischer et al. | 204—159.11 |

MURRAY TILLMAN, Primary Examiner

R. B. TURER, Assistant Examiner

U.S. Cl. X.R.

96—75, 91 R, 114, 115 P; 117—93.31, 132 BE, 138.8 N, 155 R; 204—159.13, 159.14, 159.18, 159.21, 159.24; 260—2 XA, 47 ER, 45.7 S, 45.8 NZ, 45.9 R, 88.3 A, 824 EP, 829, 830 R, 836